Sept. 6, 1927.  
W. L. HANLEY, JR  
1,641,585  
BRICKMAKING PLANT  
Original Filed Sept. 11, 1925
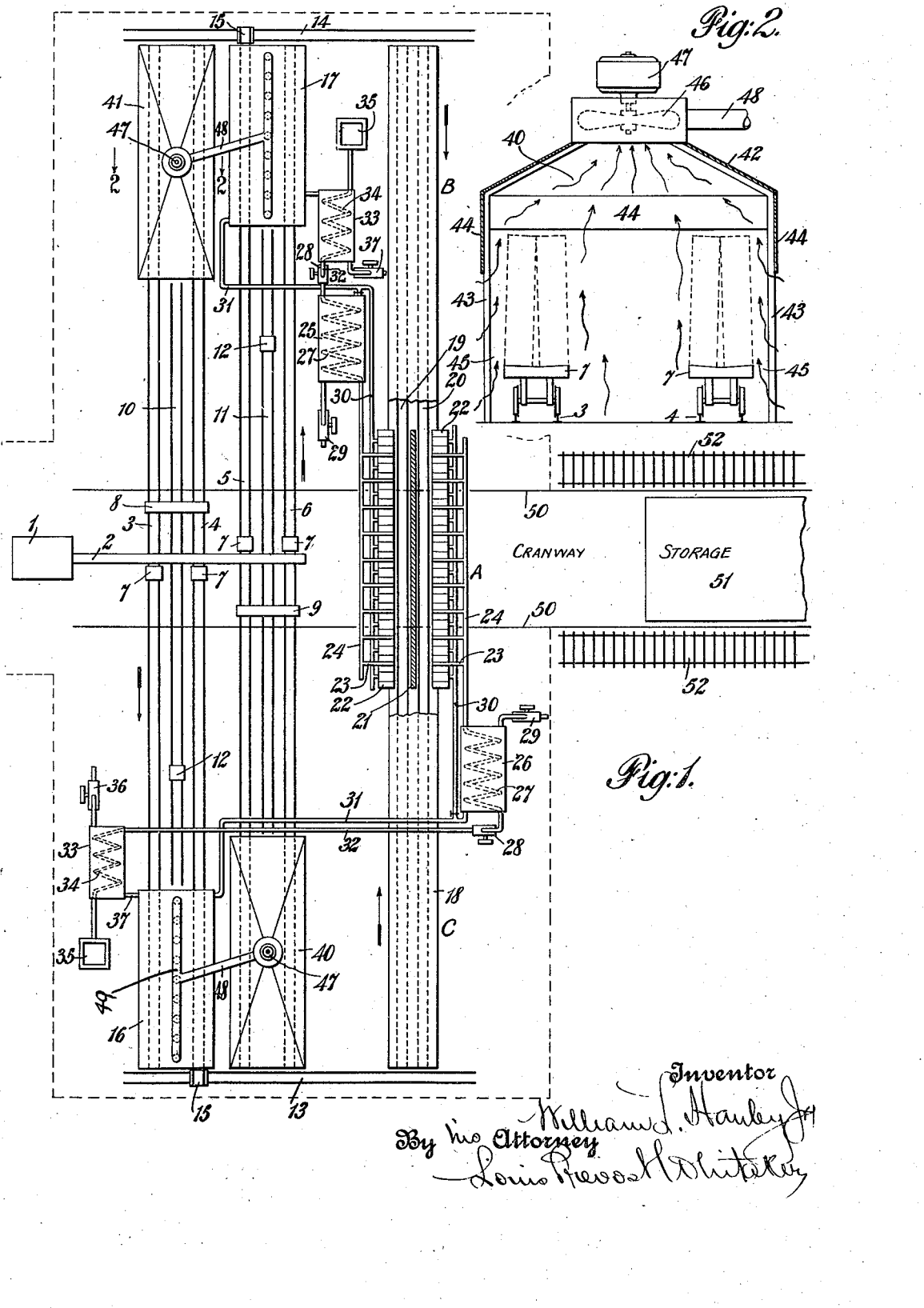

Patented Sept. 6, 1927.

1,641,585

UNITED STATES PATENT OFFICE.

WILLIAM LEE HANLEY, JR., OF BRADFORD, PENNSYLVANIA.

BRICKMAKING PLANT.

Application filed September 11, 1925, Serial No. 55,646. Renewed July 19, 1927.

My invention consists in the novel features hereinafter described, reference being had to the accompanying drawing, which illustrates one embodiment of the same, selected by me for purposes of illustration and the said invention is fully disclosed in the following description and claims.

In the operation of brick plants, in which a tunnel kiln is employed for firing the bricks, when the cars leave the kiln, after passing through the same, and being fired and partially cooled, the bricks are still at rather high temperatures, usually 400° or 500° F., and it is necessary to allow them to stand for a considerable time before the bricks can be handled and the cars unloaded. This cooling action, as it defers the unloading of the cars, ties up a considerable number of cars in the operation of a large plant. The residual heat in the fired bricks escapes into the atmosphere, and is lost, and especially in summer, it greatly increases the temperature of the plant and makes the working conditions oppressive for the employees engaged therein. According to my present invention, I provide a heat collecting dome, or shed, located over a track, or tracks, exterior to the kiln, upon which the cars of fired bricks from the kiln can be placed. This heat collecting dome, or shed, consists of a roof, and sides, extending above and partly down around the bricks on the said cars, and is preferably provided with an exhaust fan or other air moving device in or upon the roof, communicating with the interior, by means of which the hot air rising around and through the bricks can be withdrawn from the heat collecting dome or shed, and this fan is connected with a drier, or driers, for green brick, so that the heated air can be discharged directly into the drier and distributed therein for the purpose of extracting moisture from the green bricks. By this means a strong upward current of air is drawn upward through and around the bricks, coming in beneath the heat collecting dome, or shed, and the bricks will be much more rapidly cooled than would be the case if they were allowed to stand, in the usual manner. The residual heat extracted from the bricks, is conserved and made to perform additional work in the drier, by furnishing hot fresh air instead of cold fresh air for the drier. The residual heat of the fired bricks is prevented from exerting itself upon the atmosphere of the plant, and not only so, but the surrounding air in the plant is drawn through the fan and discharged into the drier, and thence out of the plant, altogether, tending to greatly improve the ventilating conditions of the plant. My invention also affects a material saving in investment in kiln cars, as the cars can be unloaded much more quickly after they leave the kiln and fewer cars are needed in the cycle of operation in the plant. I prefer to employ in connection with my heat collecting domes, or sheds, a twin tunnel kiln construction, in which the bricks are fired by the direct action of the products of combustion in the firing zone, or zones, which are immediately withdrawn therefrom, to pass through a recuperator, in which these highly heated products of combustion impart a considerable amount of their heat to fresh air forced through the recuperator, out of contact with the products of combustion, which highly heated air is also delivered to the drier and to the burners of the furnaces for firing the bricks, and the heated products of combustion are further passed through a final heater, also supplied with fresh air, which is heated out of contact with the products of combustion and delivered into the drier for effecting the drying of the green bricks. I wish it to be understood, also, that while I have shown and described herein, my invention applied to a brick plant, it is also applicable to a plant for the manufacture of tile, or other clay products, or any other kind of ceramic products.

My invention also comprises certain novel features of construction and combination of parts hereinafter described, and pointed out in the claims.

Referring to the accompanying drawings,

Fig. 1 represents a plan view of a brick making plant embodying my present invention.

Fig. 2 is a cross sectional view illustrating one of the heat collecting domes, or sheds.

In Fig. 1, which diagrammatically represents a brick making plant having my invention embodied therein, 1, represents the brick making machine for producing the bricks, which will ordinarily be of the stiff mud type, but the invention is equally applicable to the manufacture of other kinds of brick. 2 represents an off-bearing belt, extending from the brick machine over one or more longitudinally arranged exterior tracks, for tunnel cars, indicated at 3, 4, 5 and 6, four of such tracks being shown herein. Tunnel cars are represented at 7, and it is to be understood that I prefer to use only a single type of car upon which the green bricks are loaded from the off-bearing belt and carried successively through the drier, or driers, and the kiln, being conducted thence to the heat collecting dome or shed, and thence to an unloading platform, preferably near the off-bearing belt, and after the cars are unloaded, they pass under the off-bearing belt to be reloaded and carried through the same cycle again. In the present instance I have shown a double tunnel kiln in which the cars are moved in opposite directions, as indicated by the arrows adjacent to the kiln in Fig. 1, and I have therefore shown the tracks, 3 and 4, for conveying cars in one direction, and the tracks, 5 and 6, for conveying cars in the opposite direction, see the arrows adjacent thereto. I have, therefore, provided in this instance an unloading platform, 8, adjacent to the tracks, 3 and 4, and on the other side of the off-bearing belt, an unloading platform 9, extending across the tracks, 5 and 6. The tunnel cars can be moved on the exterior tracks in any desired manner. In this instance I have shown an intermediate track, 10, between the tracks, 3 and 4, and an intermediate track, 11, between the tracks, 5 and 6, upon which can be operated an electric locomotive, indicated at 12, or other type of device, for the propulsion of the cars in any usual or preferred manner. At each end of the exterior tracks I have also shown a transfer track, indicated at 13, and 14, respectively, each provided with a transfer truck, indicated at 15, for conveying the cars to and from the kiln. 16 represents a drier for drying the green bricks loaded on the cars on tracks, 3 and 4, and 17 represents a similar drier for drying the green bricks loaded on the cars moving on the tracks, 5 and 6. The tunnel kiln, indicated at 18, is preferably of the type illustrated in my former application for Letters Patent of the United States filed October 6, 1923, and given Serial No. 666,880, and as shown, comprises the duplex, centrally located firing chamber, indicated at A, and comprising two parallel firing zones, separated by a centrally located, longitudinal, impervious wall, 21, and unitary combined preheating and cooling chambers, indicated at B and C respectively, and extending from each end of the firing chamber. The kiln is provided with two sets of interior tracks, indicated at 19 and 20, each of which extends through one of the firing zones of the duplex firing chamber, and through each of the preheating and cooling zones. The firing zones are heated by two rows of furnaces, indicated at 22, on opposite sides of the firing chamber, supplied with any desired kind of fuel and air and discharging their products of combustion into the adjacent firing zone. The furnaces are provided with means for individually regulating them (not shown) by means of which the temperature of each firing zone may be gradually increased from the entrance end to the discharge end thereof, and in accordance with a predetermined heat curve, the heat curves of the two firing zones extending in opposite directions with respect to each other. In order to prevent the products of combustion from extending into the combined preheating and cooling zones of the kiln, the products of combustion of each furnace are withdrawn by a pipe, or passage, adjacent thereto, said pipes or passages being indicated at 23, and said passages being connected to a header, or eduction pipe, 24. The eduction pipe, 24, on each side of the kiln is preferably connected with a recuperator, or recuperators, the recuperators being indicated respectively, at 25 and 26. The products of combustion are carried through the recuperator for the purpose of heating fresh air without mixing the products of combustion therewith, the recuperator being of any desired form and provided with separate passages for the air and products of combustion. In this instance I have shown each recuperator provided with a heating coil, 27, connected in turn with an eduction fan, or suction device, 28, for withdrawing the products of combustion from the adjacent furnaces and passing them through the recuperator. Air may be supplied to the recuperator in any desired way. as by a fan, 29, and this air may be utilized where its effect will be most beneficial or advantageous in the plant. In the present instance I have shown a branch pipe, 30, from each recuperator, conducting heated fresh air therefrom to supply the necessary air for combustion in the furnaces, either by admixture with gas or oil, or directly into the furnaces where solid fuel is employed. An air pipe, 31, is also connected with each recuperator, and extends to the adjacent drier, 16 or 17, discharging hot fresh air into the interior of the drier for the purpose of drying the moist stiff-mud brick or other ceramic products. This air from the recuperator will be very highly heated and will be very efficient in effecting the drying of the bricks.

When the products of combustion leave the recuperator, they still contain a very considerable quantity of heat, and this residual heat may also be employed usefully, as for example, for heating the driers. In this instance I have shown a pipe, 32, leading from each of the education fans, 28, to a heater, 33, which may be located inside of the drier or outside, as may be preferred, and provided with separate passages for air, and for the products of combustion, and the products of combustion are conducted through this heater, for example, through a coil, 34, as herein shown, from which they are passed into a stack, 35, or otherwise disposed of. Additional quantities of fresh air supplied, for example, by fan or blower, 36, are passed through the air heater, 33, and delivered into the drier, by pipe, 37. As the cars of fired brick are withdrawn from the kiln at each end thereof, they are transferred to one or other of the exterior tracks, 3 and 4 or 5 and 6, and passed under the heat collecting domes, or sheds, indicated at 40 and 41. As these devices are of the same construction, a description of one will suffice for both, special reference being had to Fig. 2, which represents a sectional view of one of these heat collecting domes, or sheds. Each of these domes or sheds comprise a roof member, indicated at 42, of any desired construction, but preferably so constructed that the heated air will be conducted through a single, preferably centrally located collecting point, or aperture, which is at the highest portion of the roof, as indicated in the drawings. The roof is supported by suitable uprights, 43, and side portions, indicated at 44, may be provided from the roof downwardly, as far as desired, on the sides, it being obvious that these lateral portions at the ends of the structure must not extend downward far enough to interfere with the passage of the loaded cars thereunder. I prefer that the lateral portions, or sides, should extend only part way down to the ground so as to leave openings, indicated at 45, all the way around the structure for the admission of air from the surrounding atmosphere, so that it will pass up through, around and between the cars of bricks, and extract the residual heat therefrom. This heated air is withdrawn from the top of the roof, 42, through a suitable aperture, in this instance by means of a suction fan, indicated at 46, and operated by an electric motor, 47, or in any other desired manner. This heated air is conveyed by a pipe, 48, to a drier. In this instance it is shown as connected to a manifold, 49, which is in turn connected by a plurality of apertures, or passages, with the interior of the drier.

It will be noted that by simply running a plurality of cars loaded with the highly heated bricks, or other products, as they are removed from the kiln, beneath the heat collecting domes, the products will be more rapidly cooled than would otherwise be the case, so that the cars can be more quickly unloaded and made available for the reception of additional quantities of green brick from the off-bearing belts. The residual heat of the bricks under the heat collecting domes, or sheds, is not only conserved, but is withdrawn from the interior of the plant and conducted to the drier where it can be made to do useful work and the withdrawal of large quantities of air from the plant by the fans, 46, not only supplies the fresh heated air to the drier, but greatly improves the ventilation of the plant itself, it being understood that the apparatus indicated in Fig. 1, is contained within an enclosing structure, as indicated roughly in dotted lines in said figures. I prefer to provide a craneway, indicated at 50, extending transversely over the unloading tables, 8 and 9, where the bricks are unloaded from the cars after being cooled beneath the heat collecting domes, or shades, and from whence they are transferred to a suitable storage warehouse, indicated at 51, or are shipped on cars on railway tracks, 52—52, as may be preferred. While I have shown a double tunnel kiln in connection with the embodiment of my invention illustrated in Fig. 1, it is obvious that I may employ it in connection with a single tunnel kiln having the characteristics of the kiln herein shown with which it combines usefully and practically or it may be employed in connection with any other type of kiln for effecting the new and useful results hereinbefore described.

While I prefer to utilize the heated air from the heat collecting domes, or sheds in the driers, it is obvious that this heated air could be utilized for other purposes, as for heating the building in winter, or for any other purpose for which hot air may be useful or advantageous.

As before stated, while I have shown and described my invention as applied to the manufacture of bricks, I wish it to be understood that it may be advantageously employed in connection with the manufacture of other coarse clay products, and other ceramic products, and in connection generally with manufacturing processes in which products are raised to high temperature in a kiln or oven, and are still at a comparatively high temperature when removed therefrom.

What I claim and desire to secure by Letters Patent is:

1. In a plant for the manufacture of ceramic products, the combination with a kiln, provided with means for receiving cars carrying the products to be fired, exterior tracks for receiving said cars when removed from the kiln, a heat collecting dome extending over said exterior tracks, and means for conducting the air heated by said fired products from the heat collecting dome to a point where said air may be utilized.

2. In a plant for the manufacture of ceramic products, the combination with a kiln and means for moving the product to be fired therethrough, of a heat collecting element arranged adjacent the kiln but independent thereof and adapted to receive the fired product from the kiln, and means for conducting the heat, given off by said fired product in the heat-collecting element, to a point where it may be utilized.

3. In a brick plant, the combination with a firing kiln, provided with tracks for cars carrying the products to be fired, exterior tracks for receiving cars containing the fired products when removed from the kiln, a drier for drying the products preparatory to firing the same, a heat collecting dome extending over said exterior tracks, and means for conducting the air heated by the fired products, from said heat collecting dome to the drier.

4. In a brick plant, the combination with a drier, provided with a track for tunnel cars extending therethrough, a tunnel kiln provided with a track for tunnel cars extending therethrough, an exterior track for receiving cars of fired products from the kiln, means for transferring the cars from the drier to the kiln, and from the kiln to said exterior tracks, a heat collecting dome extending over a portion of the exterior track, and means for conducting the air heated by the fired products within said heat collecting dome to the drier.

5. In a brick plant, the combination with a drier, a track for tunnel cars extending therethrough, a tunnel kiln provided with a firing zone, furnaces for heating the firing zone, means for withdrawing the products of combustion, a recuperator for receiving the products of combustion from said furnaces, means for supplying air to the recuperator, and means for conducting the heated air from the recuperator to the drier, a receiving track exterior to said kiln and drier for receiving the tunnel cars carrying fired products from the kiln, a heat collecting dome extending over a portion of said exterior track, and means for conducting air heated by said fired products within the heating dome to the drier.

6. In a brick plant, the combination with a drier, a track for tunnel cars extending therethrough, a tunnel kiln provided with a firing zone, furnaces for heating the firing zone, means for withdrawing the products of combustion, a recuperator for receiving the products of combustion from said furnaces, means for supplying air to the recuperator, and means for conducting the heated air from the recuperator to the drier, a receiving track exterior to said kiln and drier for receiving the tunnel cars carrying fired products from the kiln, a heat collecting dome extending over a portion of said exterior track, and means for conducting air heated by said fired products within the heating dome to the drier, an auxiliary heating device for the drier having passages for the products of combustion connected with the corresponding passages of the recuperator, and separate passages for air connected with the drier.

7. In a brick plant, the combination with a twin tunnel kiln, said kiln being provided with a firing chamber having separate firing zones, furnaces for heating said firing zones, two series of exterior tracks for tunnel cars arranged alongside of and substantially parallel to the kiln, a drier extending over portions of each series of said exterior tracks, said driers being located on opposite sides of the center of the kiln, each series of exterior tracks being provided with a heat collecting dome extending over portions of the same, on the opposite side of the center of the kiln from the drier through which said tracks pass and adjacent to the drier for the other series of exterior tracks, and means for conducting heated air from each of said heat collecting domes to the adjacent drier.

8. In a brick plant, the combination with a twin tunnel kiln, said kiln being provided with a centrally located firing chamber having separate firing zones, furnaces for heating said firing zones, two series of exterior tracks for tunnel cars arranged alongside of and substantially parallel to the kiln, a drier extending over portions of each series of said exterior tracks, said driers being located on opposite sides of the center of the kiln, each series of exterior tracks being provided with a heat collecting dome extending over portions of the same, on the opposite side of the center of the kiln from the drier through which said tracks pass and adjacent to the drier for the other series of exterior tracks, and means for conducting heated air from each of said collecting domes to the adjacent drier, recuperating means for receiving the products of combustion from said furnaces, and means for passing air through said recuperating means, and supplying it to the said driers.

9. The combination with a kiln, provided with means for receiving cars carrying the products to be fired, exterior tracks for receiving the said cars when removed from the kiln, a drier for drying the products preliminary to firing, a heat collecting dome extending over said exterior tracks, and means for conducting the air heated by said fired products beneath the heat collecting dome, to and delivering it into the drier.

In testimony whereof I affix my signature.

WILLIAM LEE HANLEY, Jr.